United States Patent Office 3,446,587
Patented May 27, 1969

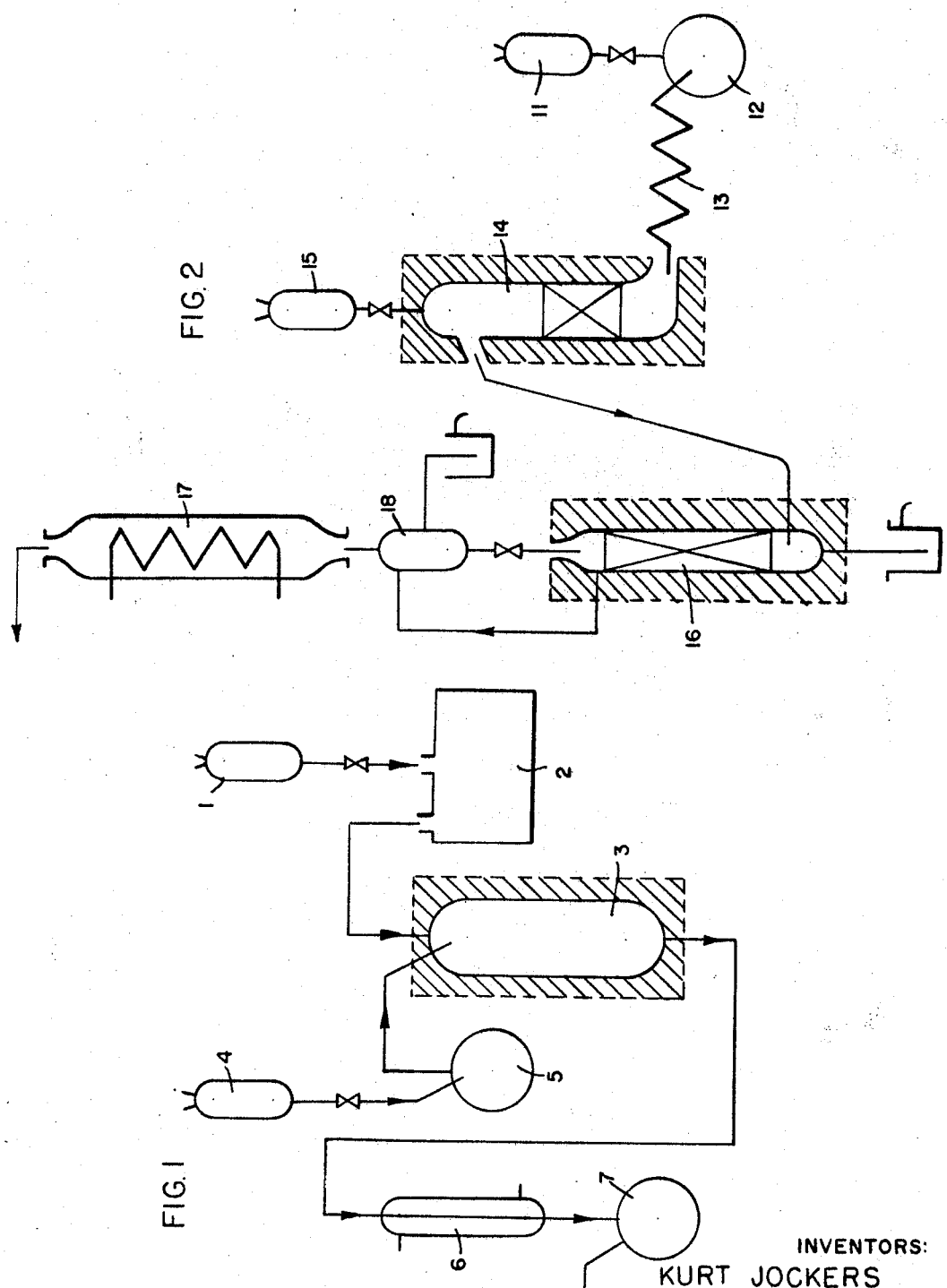

3,446,587
PRODUCTION OF NITRIC OXIDE
Kurt Jockers, Hermann Meier, and Ludwig Taglinger, Ludwigshafen, Rhine, Germany, assignors to Badische Anilin- & Soda-Fabrik Aktiengesellschaft, Ludwigshafen (Rhine), Germany
Filed Nov. 23, 1966, Ser. No. 596,479
Claims priority, application Germany, Dec. 4, 1965, B 84,839
Int. Cl. C01b 21/24
U.S. Cl. 23—157                                    9 Claims

ABSTRACT OF THE DISCLOSURE

Process for the production of nitric oxide in which liquid or vaporous sulfur is reacted with aqueous nitric acid in a molar ratio of $HNO_3$:sulfur of at least 4:3 at a temperature of about 350° C. to 650° C.

---

High-percentage nitric oxide, i.e. having a concentration of more than 90%, is required to an increasing extent in industry, for example for the catalytic synthesis of hydroxylamine by reacting nitric oxide and hydrogen in the presence of strong acids.

Nitric oxide having a concentration of more than 95% by volume is prepared to a great extent by burning ammonia with oxygen with an admixture of steam as protective gas. The process can however only be used in a large factory in which the necessary starting materials (oxygen and ammonia) are available and in which the dilute nitric acid obtained as a byproduct can be utilized.

Another method for the production of nitric oxide consists in reacting sulfur dioxide in 50 to 80% sulfuric acid with nitric acid at temperatures of 25° to 95° C., using stoichiometric amounts of the reactants according to the equation: $3SO_2+2HNO_3+2H_2O \rightarrow 3H_2SO_4+2NO$. This method has the disadvantage that a large amount of sulfuric acid having a concentration of 50 to 80% by weight is inevitably obtained and this cannot in every case be immediately utilized. Another disadvantage of the method is that it requires high-percentage sulfur dioxide whose production is expensive.

Finally it is also known that nitrogen dioxide (or dinitrogen tetroxide) can be prepared by reacting nitric acid with sulfur. The nitric acid used has a concentration of more than 80%, preferably more than 95%, and the reaction components are reacted with each other at temperatures of from 100° C. to the melting point of sulfur. The main products formed in this reaction, in addition to the desired dinitrogen tetroxide, are sulfuric acid, small amounts of nitrosyl-sulfuric acid and its anhydride, nitric oxide and dinitrogen trioxide. The reaction gas containing dinitrogen tetroxide is treated with anhydrous nitric acid to convert the lower nitrogen oxides contained in it.

The object of the present invention is to conduct the reaction of sulfur with nitric acid so that the nitrogen oxide mainly obtained is nitric oxide.

This object is achieved according to this invention by reacting the two reaction components with each other in a molar ratio of $HNO_3$ to sulfur of at least 4:3 in a reaction zone at temperatures of from 350° to 650° C. and if desired isolating the nitric oxide formed from the hot reaction gas.

By maintaining the conditions according to this invention surprisingly the reaction is conducted in such a way that mainly nitric oxide is obtained. It was not to be expected that at such high temperatures the nitric acid would be reduced only to nitric oxide and not to nitrogen. At the chosen minimum molar ratio of $HNO_3$ to sulfur of 4:3, the main product, apart from nitric oxide, is sulfur dioxide. In the case of higher ratios, sulfuric acid is formed to an increasing extent besides sulfur dioxide. At a ratio of 6.0:3 or more practically no sulfur dioxide is formed, but only sulfuric acid apart from nitric oxide. In order to ensure that the reaction gas contains no sulfur dioxide it is advantageous to use a slight excess of nitric acid beyond the ratio of 6.0:3.0. This excess may be for example up to about 15%, preferably up to 5%, beyond the stoichiometric amount. The excess of nitric acid used is converted in the reaction chamber into dinitrogen trioxide or dinitrogen tetroxide which may be separated from the reaction gas in a conventional way by acid or alkaline absorption. Obviously a larger excess of nitric acid may be used but this has the disadvantage that either larger amounts of nitric acid or alkali nitrites are obtained, while the yield of nitric oxide is impaired. When a ratio of from about 6:3 to 6.9:3 is maintained in the reaction, nitric oxide and sulfuric acid are formed in just the right amount required for the catalytic hydroxylamine method according to the equation:

$$2NO+3H_2+H_2SO_4 \rightarrow (NH_3OH)_2SO_4$$

so that the process according to this invention is particularly suitable as a preliminary stage for the production of nitric oxide and sulfuric acid for the said synthesis. Another advantage of the process according to this invention is that in addition to nitric acid it requires sulfur as starting material which is readily accessible. If the reaction is conducted so that mainly sulfur dioxide is formed apart from nitric oxide, this reaction gas may be used for the production of hydroxylammonium disulfonate.

If it is desired to prepare pure nitric oxide by the process according to this invention, the molar ratio of the reactants is chosen so that apart from nitric oxide only sulfuric acid is formed. To separate the sulfuric acid, the reaction gas is cooled and the sulfuric acid condensed out. If cooling of the reaction gas be carried out in one stage, a dilute sulfuric acid is obtained which is contaminated with excess nitric acid. In order to obtain pure sulfuric acid, the condensation is carried out in two or more stages, for example advantageously in a distillation column, the temperature in the individual stages being chosen so that sulfuric acid which contains as small an amount as possible of nitric acid is obtained in the first stage.

The reaction is carired out in a reactor made for materials which are resistant to heat and acid. Sulfur may be supplied to the reactor in the form of vapor, i.e. at a temperature above its boiling point, or in liquid form. When liquid sulfur is used, it is advantageous to introduce it into the reactor in a conventional way in very fine dispersion, for example by spraying. Nitric acid is advantageously introduced into the reactor in the form of vapor. The temperature of the vapor may be from about 130° to 330° C. depending on its concentration. In this way it is possible to maintain the desired temperature of 350° to 650° C. in the reaction zone without additional supply of heat. It is advantageous to carry out the reaction at temperatures above the boiling point of sulfur, particularly at temperatures of 450° to 650° C.

The concentration of the nitric acid used may vary within wide limits and advantageously is from about 30 to 70% by weight. It is not necessary to use a highly concentrated nitric acid for the process according to this invention; this is of importance for economic reasons.

The process according to this invention will now be described with reference to FIGURES 1 and 2 of the accompanying drawings. FIGURE 1 shows diagrammatically a plant in which the reaction is carried out by means of sulfur vapor, while FIGURE 2 illustrates a plant in which the reaction is carried out with liquid sulfur.

Referring to FIGURE 1, liquid sulfur is fed from a reservoir 1 into a sulfur vaporizer 2 and passes thence through a heated pipe into a heat-insulated reactor 3. At the same time nitric acid is fed from a reservoir 4 into a nitric acid vaporizer 5 and also passes thence into the upper part of the reactor 3. The reaction gas is withdrawn from the reactor and cooled to room temperature in a cooler 6, sulfuric acid and excess nitric acid being collected in the receiver 7 and the nitric oxide being withdrawn from the upper portion of the receiver.

In the plant shown in FIGURE 2, nitric acid is fed from a reservoir 11 into a nitric acid vaporizer 12 and the nitric acid vapor leaving this vaporizer is further heated in a superheater 13. The vapor is passed into the lower portion of a reactor 14 which is heat-insulated and one-third filled with Raschig rings, liquid sulfur being dripped into the upper end of the reactor 14 from a reservoir 15. The reaction gas is withdrawn from the upper portion of the reactor and passed into the lower portion of a column 16 filled with Raschig rings. A cooler 17 is provided at the top of the said column 16, and a separating vessel 18 between the cooler and the column. The temperature in the column 16 is controlled by the reflux from the separating vessel 18 so that the sulfuric acid draining away from the lower portion of the column is not contaminated by nitric acid. The nitric oxide is freed from the nitric acid and water contained in it in the cooler 17. The two liquids are separated from the gas in the separating vessel 18. Nitric oxide escapes at the upper end of the condenser 17.

The invention is illustrated by the following examples.

EXAMPLE 1

This example is given with reference to FIGURE 1. 200 parts by weight per hour of sulfur is dripped into the vaporizer 2 which is made of aluminum and is heated at 550° C. The vaporized sulfur passes into the reactor and is mixed therein with 2,050 parts by weight per hour of a nitric acid vapor which has been formed by vaporizing an appropriate amount of a 40% nitric acid in the vaporizer. The gas leaving the reactor is colored pale brown by the excess of nitric acid used. A temperature of 550° to 600° C. is maintained in the reactor. A gas is withdrawn from the receiver and washed with caustic soda solution; it consists of 99.0% by volume of nitric oxide. The remainder is nitrogen and dinitrogen monoxide. The gas is obtained at the rate of 340 parts by weight per hour. 1,840 parts by weight of a 33% sulfuric acid which is contaminated by about 4% of nitric acid is obtained.

EXAMPLE 2

This example is given with reference to FIGURE 2. 200 parts by weight of sulfur heated up to 130° C. is dripped per hour into the reactor 14. At the same time 1,360 parts by weight of 59% by weight nitric acid is vaporized per hour in vaporizer 12 and superheated in superheater 13. At the commencement of the reaction, the nitric acid vapor is heated to 400° C. After the reaction has started in the reactor 14, the temperature rises quickly so that the temperature of the nitric acid vapor introduced may be lowered to about 200° to 230° C. The temperature in the reactor is thus kept constant at about 550° to 580° C. 870 parts by weight of a 70% by weight sulfuric acid which is free from nitric acid is withdrawn per hour from the bottom of column 16. The amount of gas withdrawn per hour from the top of the cooler 17 contains 362 parts by weight of nitric oxide and 25 parts by weight of nitrogen dioxide. After this gas has been washed with caustic soda solution, a 99.0% nitric oxide is obtained.

EXAMPLE 3

As described in Example 2, 200 parts by weight of sulfur heated to 130° C. is introduced per hour into the reactor 14 of the plant shown in FIGURE 2. At the same time 900 parts by weight per hour of 59% nitric acid is vaporized in vaporizer 12 and the vapor is introduced into the reactor 14. In order to initiate the reaction the nitric acid vapor is heated to about 400° C. The start of the reaction may be recognized by a temperature increase in the reactor to 550° to 600° C. The temperature of the nitric acid vapor supplied may then be lowered to about 200° C. The water formed in the reaction and the water introduced with the nitric acid is separated by the cooler 17 together with a small amount of sulfuric acid. The amount of gas withdrawn per hour from the top of the cooler 17 consists of 380 parts by weight of sulfur dioxide, 240 parts by weight of nitric oxide and a small amount of nitrous oxide.

We claim:

1. A process for the production of nitric oxide which comprises reacting sulfur with aqueous nitric acid in a molar ratio of $HNO_3$ to sulfur of at least 4:3 in a reactor maintained at a temperature of from 350° to 650° C.

2. A process as claimed in claim 1 wherein the nitric oxide formed is isolated from the hot reaction gas.

3. A process as claimed in claim 1 wherein the upper limit of the molar ratio of $HNO_3$ to sulfur is 6.9:3.

4. A process as claimed in claim 1 wherein the reactants are reacted with each other at temperatures of from 450° to 650° C.

5. A process as claimed in claim 1 wherein the nitric acid used has a concentration of 30 to 70% by weight.

6. A process as claimed in claim 1 wherein sulfur is introduced into the reactor in liquid or vaporous form.

7. A process as claimed in claim 1 wherein the nitric acid has a concentration of about 30 to 70% by weight and the molar ratio of $HNO_3$:sulfur is from 4:3 to 6.9:3.

8. A process as claimed in claim 7 wherein the molar ratio of $HNO_3$:sulfur is approximately 4:3.

9. A process as claimed in claim 7 wherein the molar ratio of $HNO_3$:sulfur is approximately 4:3.

References Cited

UNITED STATES PATENTS 2,725,280  11/1955  Yodis _____ 23—157

OTHER REFERENCES

Mellor: Comprehensive Treaties on Inorganic and Theoretical Chemistry, vol. 8; Longmans, Green & Co., New York, 1922, pp. 418 and 585.

Cottrell, A.: The Manufacture of Nitric Acid and Nitrates; Van Nostrand Co., New York, 1923; page 347.

Thorne, P. C. L., et al.: Fritz Ephraim Inorganic Chemistry, 5th edition, Interscience Publishers, New York, 1954, pp. 698 and 700.

OSCAR R. VERTIZ, *Primary Examiner.*

G. O. PETERS, *Assistant Examiner.*

U.S. Cl. X.R.

23—162

UNITED STATES PATENT OFFICE
CERTIFICATE OF CORRECTION

Patent No. 3,446,587  May 27, 1969

Kurt Jockers et al.

It is certified that error appears in the above identified patent and that said Letters Patent are hereby corrected as shown below:

Column 4, line 45, "approximately 4.3" should read -- about 6:3 to 6.9:3 --.

Signed and sealed this 21st day of April 1970.

(SEAL)
Attest:

Edward M. Fletcher, Jr.           WILLIAM E. SCHUYLER, JR.
Attesting Officer                      Commissioner of Patents